US011459940B2

(12) United States Patent
Barr

(10) Patent No.: US 11,459,940 B2
(45) Date of Patent: Oct. 4, 2022

(54) METHODS AND SYSTEMS FOR A TURBOCHARGER

(71) Applicant: Ford Global Technologies, LLC, Dearborn, MI (US)

(72) Inventor: William Gerald Barr, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/027,401

(22) Filed: Sep. 21, 2020

(65) Prior Publication Data
US 2021/0087965 A1   Mar. 25, 2021

(30) Foreign Application Priority Data
Sep. 24, 2019   (GB) ...................................... 1913747

(51) Int. Cl.
| | |
|---|---|
| F02B 37/04 | (2006.01) |
| F02B 39/10 | (2006.01) |
| F02B 39/08 | (2006.01) |
| F02B 37/12 | (2006.01) |

(52) U.S. Cl.
CPC .............. *F02B 37/04* (2013.01); *F02B 37/12* (2013.01); *F02B 39/08* (2013.01); *F02B 39/10* (2013.01)

(58) Field of Classification Search
CPC .......... F02B 37/04; F02B 39/10; F02B 39/08; F02B 37/12; F02B 37/10; F02B 37/14
See application file for complete search history.

(56) References Cited

U.S. PATENT DOCUMENTS

| | | | |
|---|---|---|---|
| 3,473,322 A | 10/1969 | Wolf | |
| 3,869,866 A | 3/1975 | Timoney | |
| 4,285,200 A | 8/1981 | Byrne et al. | |
| 4,996,844 A * | 3/1991 | Nancarrow | F02B 37/14 60/608 |
| 6,378,307 B1 | 4/2002 | Fledersbacher et al. | |
| 8,387,382 B1 | 3/2013 | Dunn | |
| 2005/0223698 A1* | 10/2005 | Murata | F01N 3/0842 60/286 |
| 2006/0032225 A1* | 2/2006 | Dyne | F02B 37/10 60/607 |
| 2009/0044788 A1 | 2/2009 | Shutty et al. | |

(Continued)

FOREIGN PATENT DOCUMENTS

| | | |
|---|---|---|
| DE | 3008181 A1 | 9/1981 |
| DE | 4205020 A1 | 8/1993 |

(Continued)

OTHER PUBLICATIONS

Great Britain Intellectual Property Office, Combined Search and Examination Report under Sections 17 and 18(3), dated Feb. 27, 2020, 9 pages.

*Primary Examiner* — Audrey B. Walter
*Assistant Examiner* — Edward Bushard
(74) *Attorney, Agent, or Firm* — Vincent Mastrogiacomo; McCoy Russell LLP

(57) ABSTRACT

Methods and systems are provided for a turbocharger. In one example, the turbocharger comprises an injector configured to inject a medium therein, wherein the injector is configured to inject the medium toward a turbine of the turbocharger. The turbocharger further comprising a turbine driven by exhaust gases.

17 Claims, 3 Drawing Sheets

(56) References Cited

U.S. PATENT DOCUMENTS

| | | | | |
|---|---|---|---|---|
| 2010/0077746 A1* | 4/2010 | Gray, Jr. | ............... | F02M 25/12 |
| | | | | 60/604 |
| 2012/0198843 A1* | 8/2012 | Sun | ...................... | F01K 27/005 |
| | | | | 60/608 |
| 2012/0266595 A1* | 10/2012 | Buschur | ............... | F02B 39/085 |
| | | | | 60/607 |
| 2017/0122339 A1* | 5/2017 | Sun | .......................... | F02C 6/12 |
| 2018/0135541 A1* | 5/2018 | Hsieh | ...................... | F02P 5/145 |

FOREIGN PATENT DOCUMENTS

| | | | |
|---|---|---|---|
| DE | 102009029735 A1 | | 12/2010 |
| EP | 0174867 A2 | | 3/1986 |
| FR | 1476407 A | | 4/1967 |
| GB | 288217 A | | 6/1928 |
| GB | 1140877 A | | 1/1969 |
| JP | S5810114 A | | 1/1983 |
| JP | H0726972 A | | 1/1995 |
| JP | H0835432 A | | 2/1996 |
| JP | 3249328 B2 | | 1/2002 |
| JP | 3249329 B2 | | 1/2002 |
| JP | 3249330 B2 | | 1/2002 |
| JP | 2006090174 A | | 4/2006 |
| JP | 2013227883 A | * | 11/2013 |
| JP | 2013227883 A | | 11/2013 |
| WO | 2006032402 A1 | | 3/2006 |

* cited by examiner

METHODS AND SYSTEMS FOR A TURBOCHARGER

CROSS REFERENCE TO RELATED APPLICATIONS

The present application claims priority to Great Britain Patent Application No. 1913747.0 filed on Sep. 24, 2019. The entire contents of the above-listed application is hereby incorporated by reference for all purposes.

FIELD

The present description relates generally to a turbocharger apparatus for a vehicle, such as a motor vehicle (e.g. car, van, truck, motorcycle etc.), industrial or agricultural vehicles (e.g. tractor, forklift, bulldozer, excavator etc.), marine vessel, aircraft or any other type of vehicle.

BACKGROUND/SUMMARY

A turbocharger for a vehicle may comprise a compressor, a turbine, and an axial shaft connecting the compressor to the turbine. The turbine is generally driven by exhaust gases from the engine of the vehicle. The turbocharger is configured to compress air and provide the compressed air into the engine, thereby increasing the power and efficiency of the engine.

As there is commonly a delay between throttling up the engine and the development of increased exhaust gas flow and pressure, there may be a consequential time lag before the turbocharger output reaches the desired value.

Existing anti-lag technologies are expensive, add complexity, and cause rotor balance issues. In one example, the issues described above may be addressed by a turbocharger, comprising a compressor, a first turbine configured to drive the compressor, the first turbine configured to be driven by exhaust gases, a second turbine configured to drive the compressor, a nozzle, and a fuel supply configured to deliver engine fuel to the nozzle, wherein the second turbine is configured to be driven by fuel ejected from the nozzle.

As one example, the turbocharger comprises a pressurized fuel inlet. A controller valve and nozzle comprise an electrical connection to a control unit configured to adjust a flow of pressurized fuel to the nozzle. The fuel from the nozzle impacts a Pelton or other type of turbine connected to a turbocharger shaft assembly. By doing this, the turbocharger speed may be increased during a transient condition where exhaust gas production is too low to meet a driver demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
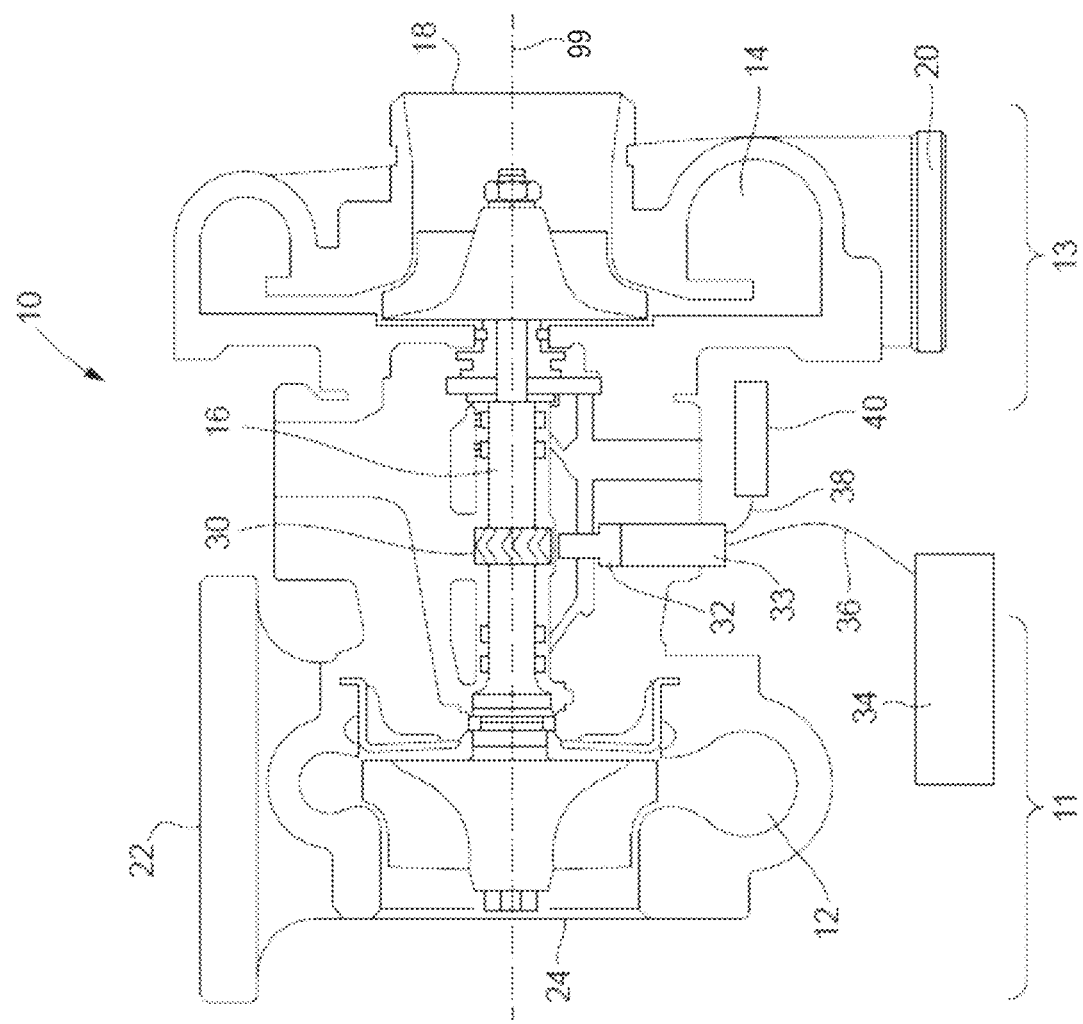
FIG. 1 schematically shows a turbocharger apparatus.
Figure 2:
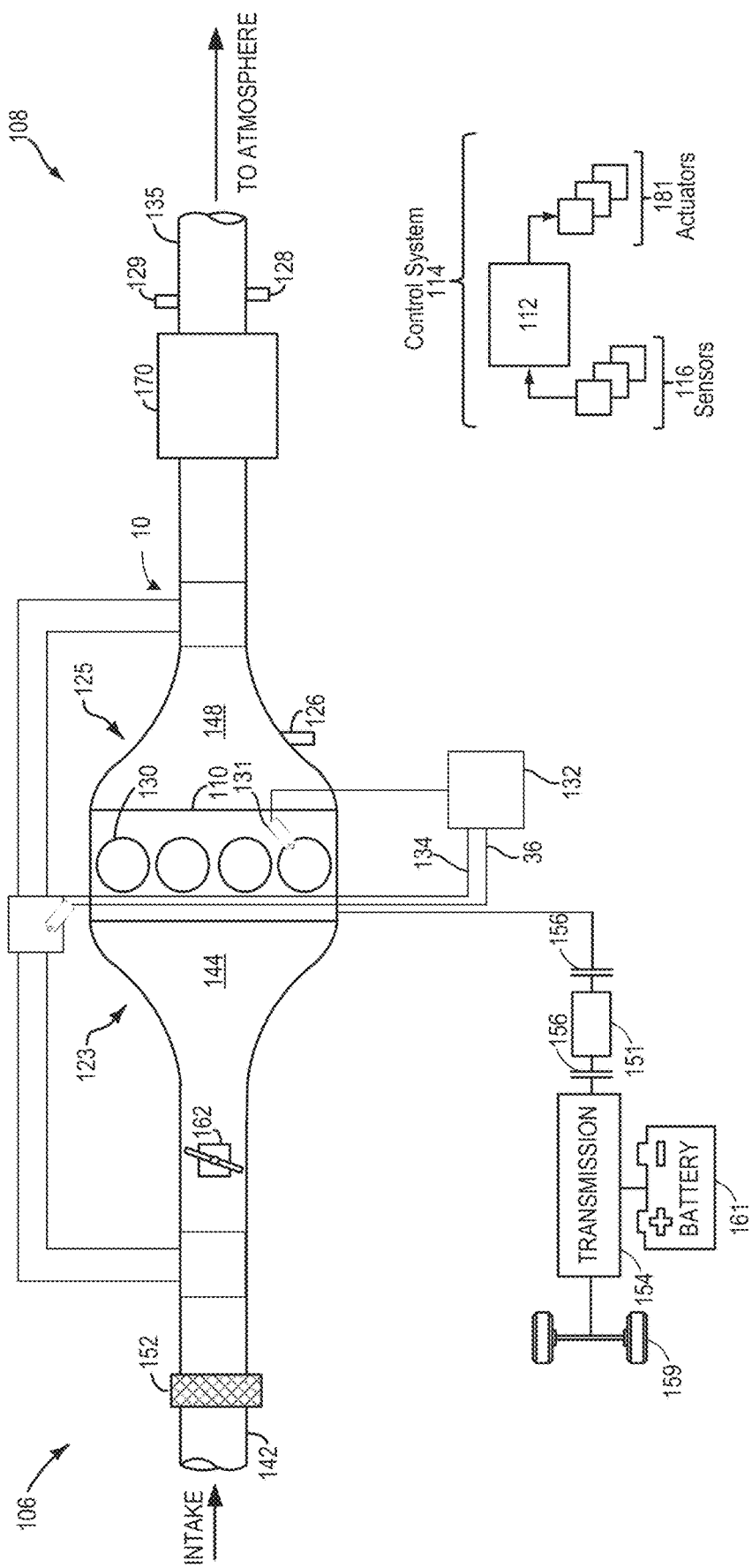
FIG. 2 illustrates a schematic of an engine included in a hybrid vehicle.
Figure 3:
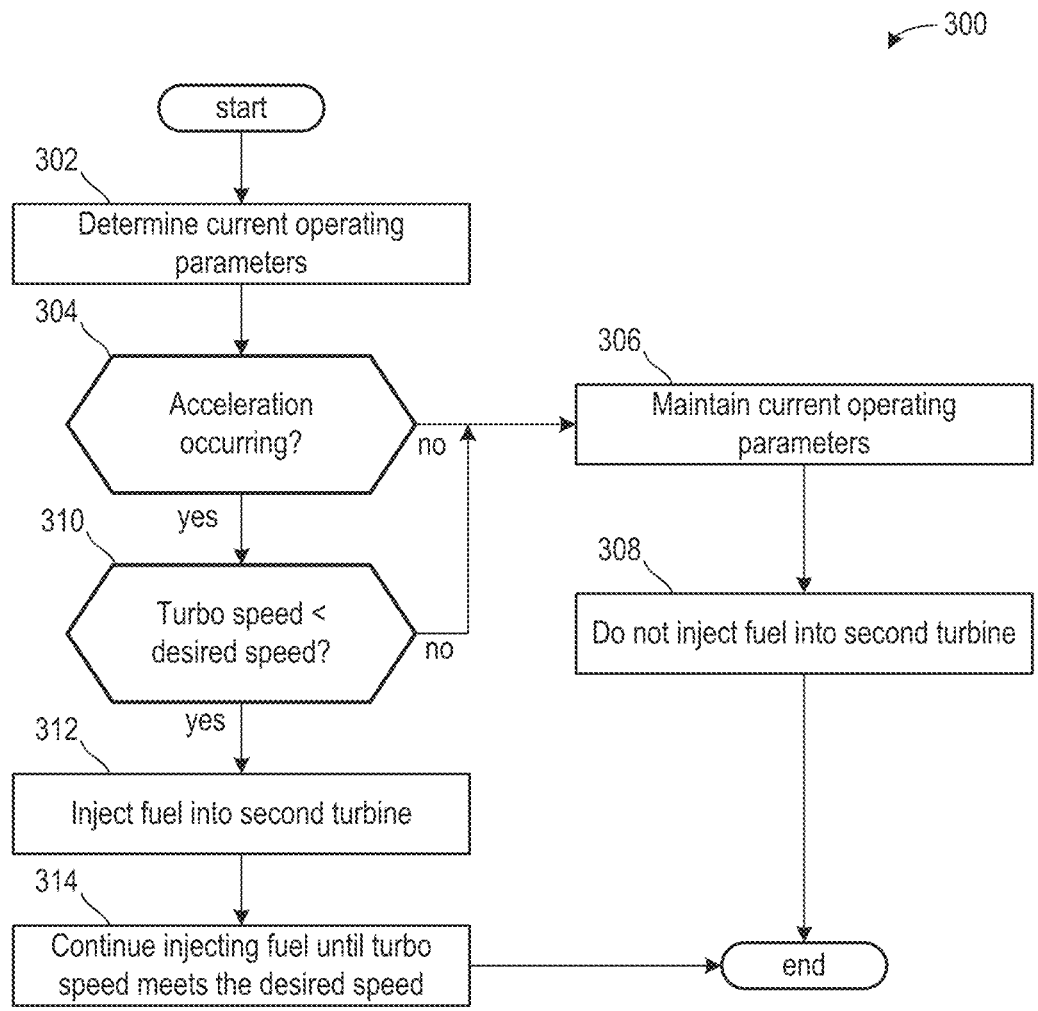
FIG. 3 illustrates a method for operating a turbocharger.

The following description relates to systems and methods for a turbocharger. FIG. 1 schematically shows a turbocharger apparatus. FIG. 2 illustrates a schematic of an engine included in a hybrid vehicle. FIG. 3 illustrates a method for operating a turbocharger.

According to an aspect there is provided a turbocharger apparatus comprising: a compressor; a first turbine configured to drive the compressor, the first turbine configured to be driven by exhaust gases; a second turbine configured to drive the compressor; a nozzle, and a fuel supply configured to deliver engine fuel to the nozzle, wherein the second turbine is configured to be driven by fuel ejected from the nozzle.

The second turbine may be a Pelton wheel. The second turbine may be other types of fluid turbines without departing from a scope of the present disclosure.

The turbocharger may further comprise a shaft, and the first turbine may be connected to the compressor via the shaft. The second turbine may be connected to the compressor via the shaft. The first turbine and compressor may be arranged at opposing ends of the shaft. The second turbine may be arranged between the compressor and the first turbine. The second turbine may be arranged centrally between the compressor and the first turbine. The second turbine may be arranged to rotate at the same speed as the first turbine and the compressor. The second turbine, the first turbine, and the compressor may be configured to rotate up to a pre-defined speed.

The second turbine may be connected to the compressor via a gear arrangement. The second turbine may be configured to rotate up to a pre-defined speed, different to that of the compressor and the first turbine.

An engine comprising the turbocharger may combust via a fuel, such as diesel. Additionally or alternatively, the fuel may be petrol or gasoline. The fuel may be delivered from an engine fuel supply. The fuel may be delivered via a fuel delivery arrangement. The fuel may be delivered to the nozzle of a fuel injector at pressures between 10-2750 bar.

The turbocharger may comprise a valve arranged to control a flow of the fuel. The turbocharger may comprise a control unit arranged to control the valve. The control unit may be electrically connected to the valve.

The turbocharger may comprise labyrinth seals. The labyrinth seals may inhibit (e.g., block) contact between fuel and the shaft. The labyrinth seals may be provided on the shaft.

The turbocharger may further comprise a pressure regulator. The pressure regulator may be configured to reduce the pressure of fuel supplied from the engine fuel supply to the nozzle.

The turbocharger may be configured to drain fuel to a fuel injector pump.

The turbocharger may further comprise an accumulator. The accumulator may be configured to store compressed fuel. The compressed fuel may be supplied to the second turbine when demanded. The accumulator may be arranged to store up to 1 liter of compressed fuel.

The turbocharger may further comprise an injector, arranged to deliver fuel to the exhaust gas. This may allow purging of a NOx trap (or lean NOx trap (LNT), or NOx adsorber). Additionally or alternatively, the fuel may be injected into the exhaust gas to return other aftertreatment devices to a less loaded state.

The turbocharger may comprise a variable geometry inlet system. The turbocharger may comprise a variable geometry turbine. The turbocharger may further comprise an electric motor, configured to supply energy to the shaft. The electric motor provides energy to the shaft on start up so as to rotate the shaft. This may electrically assist the start-up of the turbocharger.

In an additional aspect, there is provided a method of operating a turbocharger comprising a compressor, and first and second turbines configured to drive the compressor wherein the first turbine is configured to be driven by exhaust gases, and the second turbine is configured to be driven by fuel ejected from a nozzle; the method comprising ejecting fuel from the nozzle to drive the second turbine and spin up the compressor; then supplying the first turbine with exhaust gases so as to drive the compressor.

Spinning up the compressor may comprise increasing the rotational speed of the compressor. Driving the compressor may comprise starting the rotation of the compressor from a stationary position.

Spinning up the compressor may comprise increasing the rotational speed of the compressor from zero rpm up to a pre-defined operating speed, or from speed lower than the pre-defined operating speed up to the pre-defined operating speed. The step of supplying the second turbine with fuel may continue until the compressor has reached the pre-defined operating speed. The pre-defined operating speed may be between 20,000-300,000 rpm. The step of supplying the second turbine may continue for a pre-defined length of time.

The method may further comprise supplying the first turbine with exhaust gases so as to drive the compressor.

The steps of supplying the second turbine with fuel and supplying the first turbine with exhaust gases may occur sequentially. The step of supplying the first turbine with exhaust gases may start after the step of supplying the second turbine with fuel. The step of supplying the first turbine with exhaust gases may start whilst fuel is still being supplied to the second turbine. There may be a time gap between supplying fuel to the second turbine and supplying exhaust gases to the first turbine in which no fuel is supplied to the second turbine. The control unit may send a signal to the valve to close the valve after a predetermined amount of time, when a predetermined rotational speed is reached, or when a predetermined volume of exhaust gas has passed through the first turbine.

The steps of supplying the second turbine with fuel and supplying the first turbine with exhaust gases may occur in tandem.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, a turbocharger apparatus is generally indicated at 10, having a principal (e.g., central) and rotational axis 99. The turbocharger apparatus 10 comprises a turbine section 11 comprising a first turbine 12, and a compressor section 13, comprising a compressor 14. The first turbine 12 and the compressor 14 are connected at opposing ends of an axial shaft 16. The compressor section 13 has an ambient air intake 18 and an air discharge 20. The turbine section has an exhaust gas inlet 22 and an exhaust gas outlet 24. In use, exhaust gases from an engine of a vehicle are used to drive the first turbine 12, which rotates the shaft 16, thereby driving the compressor 14. The compressor 14 compresses the air from the intake 18 and delivers compressed air from the air discharge 20 to the vehicle engine. The turbocharger apparatus 10 may be lubricated using engine oil and cooled using engine coolant.

The turbocharger apparatus 10 further comprises a second turbine 30 which is arranged on the shaft 16, between the first turbine 12 and the compressor 14. A nozzle 32 is arranged to deliver fuel from an engine fuel supply 34 (such as a fuel tank) along a supply line 36, towards the second turbine 30, so as to impact the second turbine 30. As a result of the fuel being delivered to the second turbine 30, the second turbine 30 will rotate, rotating the shaft 16 and the compressor 14, and delivering compressed air from the air discharge 20 to the vehicle engine.

A control valve 33 is provided between the engine fuel supply 34 and the nozzle 32. The operation of the control valve 33 and the nozzle 32, is controlled by a control unit 40, which is connected to the control valve 33 with an electrical connection 38. As will be discussed, the second turbine 30 is provided to enable a quicker start-up of the turbocharger apparatus, relative to using only the first turbine 12, thereby reducing turbo lag.

The second turbine 30 is sealed from the shaft 16 with labyrinth seals so as to block contact between the fuel and the shaft 16. The second turbine 30 is also provided with a fuel drain, which collects fuel after it has been used to drive the second turbine 30, and feeds the used fuel to the fuel injection apparatus of the engine.

In this embodiment, the second turbine 30 is arranged approximately centrally on the shaft 16, between the first turbine 12 and the compressor 14. It will be appreciated that in other embodiments, the second turbine 30 may be arranged in a different location on the shaft 16, or may be arranged separately from the shaft 16, for instance as part of a geared arrangement, used to drive the compressor 14.

The fuel supplied from the engine fuel supply may be at high pressures (around 100-2750 bar) and is fed through the valve 33 and the nozzle 32 at these high pressures. In other embodiments, the pressure of the fuel may be reduced before it is delivered to the second turbine 30. The reduction in pressure may be carried out by regulator valve. The pressure may be reduced from around 100-2750 bar to around 10 bar. Driving the second turbine 30 with a fuel at high pressure results in a quick acceleration of the rotation speed of the second turbine 30.

In some embodiments, an accumulator is provided in which compressed fuel can be stored. The compressed fuel can be supplied to the second turbine 30 on start up, so as to further speed up the start-up of the second turbine 30.

In some embodiments, the turbocharger apparatus 10 may further comprise an injector, arranged to inject fuel from the fuel supply into the exhaust gas stream before exit of the exhaust gas from the rear of the turbocharger. The injection of the fuel into the exhaust gas stream enables purging of a NOx trap or LNT.

In further embodiments, the turbocharger apparatus 10 may further comprise a variable geometry inlet system, a variable geometry turbine, and/or an electric motor configured to impart rotation to the shaft.

In use, when an acceleration of the engine is desired, the control unit 40 sends a signal to the valve 33 to permit flow of the fuel from the engine fuel supply 34 through the nozzle 32 to impact the second turbine 30. The second turbine 30 starts to rotate as a result, rotating the shaft 16, and thereby driving the compressor 14. The high pressure of the fuel supplied results in a faster acceleration of the second turbine 30, relative to the first turbine 12, and the compressor 14 up to the desired operating speed. The control unit 40 sends a signal to the valve 33 to close the valve after a predetermined amount of time, when a predetermined rotational speed is reached, or when a predetermined volume of exhaust gas has passed through the turbine section 11. It will be appreciated that the fuel supply will be used to drive the turbocharger intermittently throughout the period in which the engine is running, when acceleration of the vehicle is desired.

An advantage of this arrangement is that the time desired to accelerate the compressor up to the desired rotational speed is decreased. A turbocharger without a second turbine takes more time to reach the desired rotational speed as there is a delay associated with the supply of exhaust gas to the turbine, and the subsequent driving of the compressor. Therefore, the second turbine reduces the turbo lag, by accelerating the compressor much more rapidly upon start-up of the engine before sufficient exhaust gases are supplied to drive the first turbine. This has associated advantages of improved vehicle drivability, torque response, fuel economy and acceleration, whilst increasing exhaust gas recirculation flow and decreasing smoke, $NO_x$, and particulate emissions. Additionally, the turbocharger apparatus according to the present disclosure provides a low cost solution to turbo lag, with a simple control and design.

FIG. 2 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Each cylinder of the plurality of cylinders 130 may comprise an injector 131 configured to inject fuel. The injector 131 may receive fuel from a fuel system 132. In one example, the fuel system 132 may include one or more of a pump, a tank, a fuel rail, and the like.

Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, wherein engine system 108 is a boosted engine system, the engine system may further include a boosting device, such as the turbocharger 10. As such, components previously introduced may be similarly numbered in this figure. The turbocharger 10 comprises the first turbine 12, the second turbine 30, and the compressor 14. The second turbine 30 comprises the injector 32 fluidly coupled to the fuel system 132 via the supply line 36. The injector 32 is configured to inject fuel toward the second turbine 30, wherein the fuel may rotate an impeller of the second turbine 30, which may result in motion of the compressor 14. Fuel injected toward the second turbine 30 may be returned to the fuel system 132 via a return line 134. Additionally or alternatively, fuel in the second turbine 30 may be relayed directly to the injector 131 without returning to the fuel system 132.

It will be appreciated that the injector 32 may be configured to inject a medium other than fuel, such as oil or compressed air. Additionally or alternatively, an accumulator may be configured to store the medium. For example, the accumulator may be fluidly coupled to a compressor outlet such that compressed air therefrom may be stored in the accumulator. In one example, the compressed air from the compressor may be directed to the accumulator during conditions where the turbo speed is greater than a desired turbo speed, which may occur when an accelerator pedal is released following a high-load transient event (e.g., an accelerator pedal depression).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a vehicle with only an engine, or an electric vehicle with only an electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

Turning now to FIG. 3, it shows a method 300 for injecting fuel toward a portion of a turbocharger during some conditions. Instructions for carrying out method 300 may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the method described below.

The method 300 begins at 302, which includes determining, estimating, and/or measuring current engine operating parameters. Current engine operating parameters may include but are not limited to one or more of a throttle position, manifold vacuum, engine speed, engine temperature, turbine speed, and air/fuel ratio.

The method 300 may proceed to 304, which includes determining if an acceleration is occurring. An acceleration may be occurring if an accelerator pedal is being depressed. A pedal position sensor or other sensor may be used to determine a position of the accelerator pedal. If an acceleration is not occurring, then the method 300 proceeds to 306, which may include maintaining current operating parameters. The method 300 proceeds to 308, which includes not injecting fuel into the second turbine. A control valve of the fuel injector may remain in a closed position and block fuel flow to the fuel injector. As such, the second turbine may not rotate at a speed faster than the first turbine. In this way, the turbine speed is dictated via only exhaust gases.

Returning to 304, if an acceleration is occurring, then the method 300 proceeds to 310, which includes determining if a turbo speed is less than a desired turbo speed. In one example, the desired turbo speed is based on a magnitude of the acceleration request. That is to say, the desired turbo speed is based on a driver demand, wherein the driver demand is proportional to an amount the accelerator pedal is depressed. If the turbo speed is not less than the desired speed, then the turbo speed may be sufficient to meet the driver demand and the method 300 proceeds to 306 and 308 and fuel is not injected to the second turbine.

If the turbo speed is less than the desired turbo speed, then the method 300 proceeds to 312, which includes injecting fuel into the second turbine. Injecting fuel may comprise actuating a valve to an open position to supply fuel to a pressurized oil inlet of the fuel injector. As such, the second turbine impeller may rotate at a speed faster than a speed of the first turbine, thereby increasing the compressor speed to a speed greater than that produced by exhaust gas alone. As such, a turbo lag may be avoided and a driver demand may be met. Additionally or alternatively, emissions generated during the acceleration may be reduced as less exhaust gas is needed to increase the turbine speed to the desired speed.

In some examples, a fuel injection amount into the second turbine may be adjusted based on one or more of a difference between the current turbo speed and the desired turbo speed, an anticipated acceleration duration, and a fuel tank volume. In one example, as the difference increases, the fuel injection amount may also increase. As another example, as the anticipated acceleration duration increases, the fuel injection amount may also increase. The anticipated acceleration duration may be estimated via feedback from a navigation system, a driver behavior, and a vehicle speed prior to the accelerator pedal depression. Additionally or alternatively, if the fuel tank volume is lower, then the fuel injection amount may also be lower. Additionally or alternatively, the fuel injection amount may be independent of the fuel tank volume. Additionally or alternatively, a pressure of the fuel injection toward the second turbine may be adjusted, wherein the pressure of the fuel injection increases as the difference between the turbo speed and the desired turbo speed increases.

The method 300 proceeds to 314, which includes continuing to inject fuel until the turbo speed meets the desired speed. Said another way, the second turbine receives the fuel injection until the driver demand is met.

In this way, a turbocharger comprises a compressor, a first turbine, and a second turbine. The first turbine is powered via exhaust gas and the second turbine is powered via a medium different than exhaust gas. An injector may inject the medium toward the second turbine to rotate the second turbine independent of an exhaust gas flow. A technical effect of the second turbine is to increase a turbocharger speed independent of exhaust gas flow during conditions where turbo lag may occur, such as during a hard tip-in. By doing this, vehicle drivability and torque response may be enhanced such that vehicle acceleration is improved and emissions are reduced by avoiding or decreasing turbo-lag.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger of an engine system, the turbocharger comprising:
   a compressor;
   a first turbine configured to drive the compressor, the first turbine configured to be driven by exhaust gases;
   a second turbine configured to drive the compressor;
   a nozzle; and
   a fuel supply configured to deliver engine fuel to the nozzle and injectors of an engine, wherein fuel in the second turbine is relayed directly to the injectors without returning to a fuel system;
   wherein the second turbine is configured to be driven by fuel injected from the nozzle, and the turbocharger is configured to drain fuel to a fuel injector pump.

2. The turbocharger of claim 1, wherein the second turbine is connected to the compressor via a gear arrangement.

3. The turbocharger of claim 1, further comprising a valve arranged to control flow of the fuel, and a control unit arranged to control the valve.

4. The turbocharger of claim 1, wherein fuel contacting the turbocharger does not contact a shaft.

5. The turbocharger of claim 1, further comprising a valve configured to reduce a pressure of fuel supplied from the fuel supply of the engine to the nozzle.

6. The turbocharger of claim 1, wherein the turbocharger further comprises an accumulator.

7. The turbocharger of claim 1, wherein the turbocharger further comprises an injector positioned to deliver fuel to the exhaust gas.

8. The turbocharger of claim 1, wherein the turbocharger comprises a variable geometry inlet system.

9. The turbocharger of claim 1, wherein the first turbine comprises a variable geometry turbine.

10. The turbocharger of claim 1, further comprising a shaft, wherein the first turbine is connected to the compressor via the shaft.

11. The turbocharger of claim 10, wherein the second turbine is connected to the compressor via the shaft.

12. A system, comprising:
    a turbocharger comprising a first turbine and a second turbine, wherein each of the first turbine and the second turbine are coupled to a compressor via a shaft; and
    an injector positioned to inject a fuel from an engine fuel system into the turbocharger toward the second turbine, the engine fuel system further coupled to injectors of an engine, and wherein an amount of fuel injected toward the second turbine is based on a fuel tank volume.

13. The system of claim 12, wherein only the first turbine is rotated via exhaust gas generated by an engine.

14. The system of claim 12, wherein fuel in the turbocharger is drained to fuel injectors of an engine.

15. The system of claim 12, further comprising a controller with computer-readable instructions stored on non-transitory memory thereof that when executed enable the controller to eject fuel from the injector to drive the second turbine during an acceleration.

16. A method for a turbocharger of an engine system, the turbocharger comprising a compressor, and first and second turbines configured to drive the compressor, wherein the first turbine is configured to be driven by exhaust gases, and the second turbine is configured to be driven by fuel ejected directly from a nozzle; the method, comprising:
    flowing fuel from a fuel system of an engine to the nozzle, the fuel system coupled to each of engine fuel injector and the nozzle;
    injecting fuel from the nozzle to drive the second turbine and spin up the compressor during an accelerator pedal tip-in; and
    supplying exhaust gas to the first turbine after injecting fuel to drive the second turbine.

17. The method of claim 16, wherein injecting fuel comprises adjusting a pressure of fuel based on a difference between a turbocharger speed and a desired turbocharger speed.

* * * * *